(12) United States Patent
Moore

(10) Patent No.: US 8,471,857 B1
(45) Date of Patent: Jun. 25, 2013

(54) CHANGING ANIMATION DISPLAYED TO USER

(75) Inventor: David M. Moore, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/445,461

(22) Filed: Apr. 12, 2012

(51) Int. Cl.
  *G06T 13/00* (2011.01)
  *G06F 3/048* (2006.01)

(52) U.S. Cl.
  USPC ............ 345/474; 345/473; 715/802; 715/808

(58) Field of Classification Search
  USPC .......... 345/473–475; 715/706, 762, 764–765, 715/774, 808, 809, 802
  See application file for complete search history.

(56) References Cited

U.S. PATENT DOCUMENTS

| | | | | |
|---|---|---|---|---|
| 6,937,950 | B2* | 8/2005 | Cragun et al. | 702/71 |
| 7,262,775 | B2* | 8/2007 | Calkins et al. | 345/473 |
| 2004/0098462 | A1* | 5/2004 | Horvitz et al. | 709/207 |
| 2007/0016873 | A1* | 1/2007 | Lindsay | 715/781 |
| 2007/0057951 | A1* | 3/2007 | Anthony et al. | 345/473 |
| 2008/0016444 | A1* | 1/2008 | Choi | 715/710 |
| 2010/0218132 | A1* | 8/2010 | Soni et al. | 715/771 |
| 2011/0007079 | A1* | 1/2011 | Perez et al. | 345/473 |
| 2011/0138309 | A1* | 6/2011 | Skidmore et al. | 715/763 |
| 2011/0225547 | A1* | 9/2011 | Fong et al. | 715/835 |

OTHER PUBLICATIONS

Stephen R. Davis C++ for Dummies 2009, for Dummies, 6th Edition, Web ISBN: 0-470317-26-4.*
Charles R. Hardnett, Programming Like a Pro for Teens, 2011, Course Technology PTR, Web ISBN-10: 1-4354-5925-3.*
Shiv Dutta and Gary Hook, Best Practices for Programming in C, 2003, IBM developerWorks: http://www.ibm.com/developerworks/aix/library/au-hook_duttaC.html, pp. 1-12.*
Chad Concelmo, The Memory Card .03: The Encounter with Psycho Mantis 2007, http://www.destructoid.com/the-memory-card-03-the-encounter-with-psycho-mantis-31477.phtml (accessed Nov. 4, 2012), pp. 2-6.*
Daniel Johnson and Janet Wiles, Computer Games with Intelligence, 2001, Australian Journal of Intelligent Information Processing Systems, 7:61-68.*
John E. Laird, It Knows What You're Going to Do: Adding Anticipation to a Quakebot, 2001, Proceeding AGENTS '01 Proceedings of the fifth international conference on Autonomous agents, p. 385-392, I: 10.1145/375735.376343.*

(Continued)

*Primary Examiner* — Xiao M. Wu
*Assistant Examiner* — Michael J Cobb
(74) *Attorney, Agent, or Firm* — Brake Hughes Bellermann LLP

(57) ABSTRACT

A computing system may perform a method comprising displaying, on a graphical user interface (GUI) on a display of the computing system, a plurality of initial animations to a user, each of the plurality of animations being displayed in response to an identical function call, having an identical visual appearance, and being displayed to prompt an input from the user. The method may also comprise monitoring, by a processor of the computing system, the user's input to each of the plurality of animations. The method may also comprise displaying, by the GUI, a subsequent animation to the user, the subsequent animation being displayed in response to the identical function call but having a different visual appearance than the plurality of initial animations, the different visual appearance of the subsequent animation being based on the monitored inputs.

12 Claims, 5 Drawing Sheets

OTHER PUBLICATIONS

Ben Weber, Integrating Expert Knowledge and Experience in a Multi-Scale Agent, 2010, Advancement to Candidacy, University of California Santa Cruz.*

Antonio Sánchez-Ruiz, Stephen Lee-Urban, Héctor Muñoz-Avila, Belén Díaz-Agudo, Pedro González-Calero, Game AI for a Turn-based Strategy Game with Plan Adaptation and Ontology-based Retrieval, 2007, Proceedings of the ICAPS-07: The ICAPS 2007 Workshop on Planning in Games, AAAI Press, Providence, RI.*

Ben G. Weber, Michael Mateas, Arnav Jhala, Building Human-Level AI for Real-Time Strategy Games 2011, Proceedings of the AAAI Fall Symposium on Advances in Cognitive Systems, San Francisco, CA.*

Carlos Soto, How to Beat Psycho Mantis, 2010, http://www.ehow.com/how_5121096_beat-psycho-mantis.html (accessed Nov. 4, 2012), pp. 1-4.*

* cited by examiner

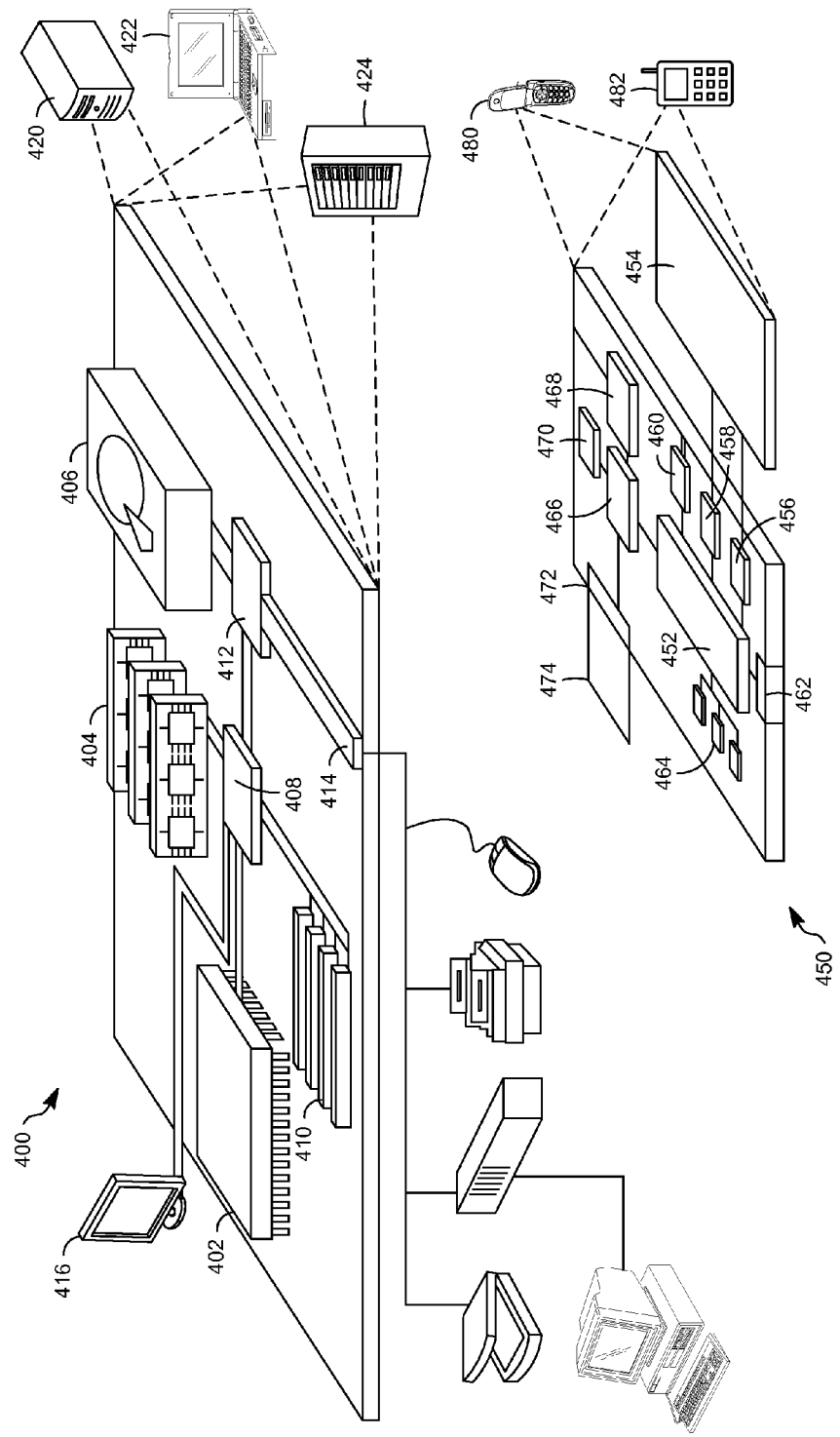

CHANGING ANIMATION DISPLAYED TO USER

TECHNICAL FIELD

This description relates to computing devices.

BACKGROUND

Operating systems or browsers may provide animations to a user, which prompt a response. The animation may initially be helpful when the user is learning the features of the browser or operating system, but may delay the user when the user becomes more familiar.

SUMMARY

According to one general aspect, a computing system may perform a method. The method may comprise displaying, on a graphical user interface (GUI) on a display of the computing system, a plurality of initial animations to a user, each of the plurality of animations being displayed in response to an identical function call, having an identical visual appearance, and being displayed to prompt an input from the user. The method may also comprise monitoring, by a processor of the computing system, the user's input to each of the plurality of animations. The method may also comprise displaying, by the GUI, a subsequent animation to the user, the subsequent animation being displayed in response to the identical function call but having a different visual appearance than the plurality of initial animations, the different visual appearance of the subsequent animation being based on the monitored inputs.

According to another general aspect, a non-transitory computer-readable storage medium may include instructions stored thereon. When executed by at least one processor, the instructions may cause a computing system to at least display, on a graphical-user interface (GUI) on a display of the computing system, a plurality of initial animations to a user, each of the plurality of animations being displayed in response to an identical function call, having an identical visual appearance, and being displayed to prompt an input from the user. The instructions may also cause the computing system to monitor, by the at least one processor of the computing system, the user's input to each of the plurality of animations. The instructions may also cause the computing system to display, by the GUI, a subsequent animation to the user, the subsequent animation being displayed in response to the identical function call but having a different visual appearance than the plurality of initial animations, the different visual appearance of the subsequent animation being based on the monitored inputs.

According to another general aspect, a non-transitory computer-readable storage medium may include instructions stored thereon. When executed by at least one processor, the instructions may cause a computing system to at least display, on a graphical user interface (GUI) on a display of the computing system, an initial calendar alert animation to a user a plurality of times, the initial calendar alert animation changing appearance as a function of time and being displayed to prompt an input from the user. The instructions may also cause the computing system to monitor, by the at least one processor of the computing system, the user's inputs to the displayed calendar alert animations. The instructions may also cause the computing system to display, by the GUI, a subsequent calendar alert animation to the user, the subsequent calendar animation having a different animation to the previously displayed calendar alert animations based on the monitored inputs.

The details of one or more implementations are set forth in the accompanying drawings and the description below. Other features will be apparent from the description and drawings, and from the claims.

BRIEF DESCRIPTION OF THE DRAWINGS

FIG. 4 shows an example of a generic computer device and a generic mobile computer device, which may be used with the techniques described herein.

DETAILED DESCRIPTION

Figure 1:
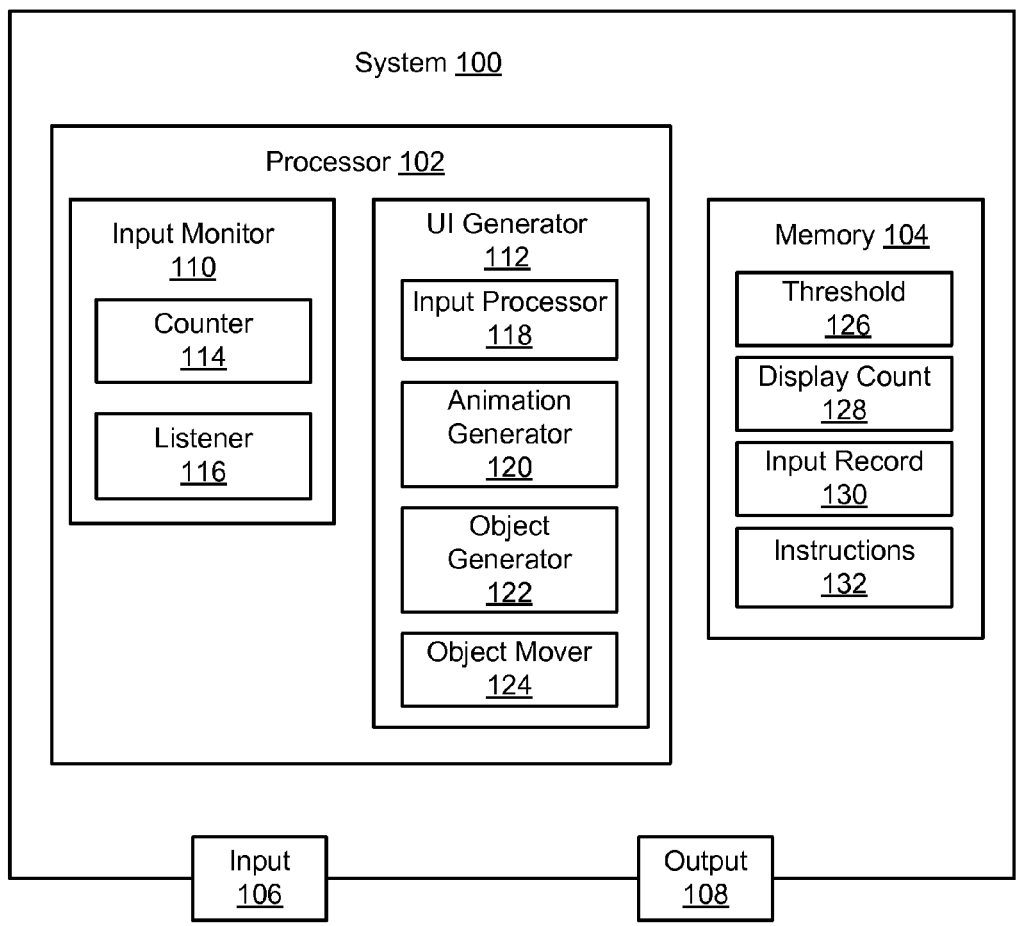
FIG. 1 is a block diagram of a system for generating and changing animations according to an example embodiment.

FIG. 1 is a block diagram of a system 100 for generating and changing animations according to an example embodiment. The system 100 may be implemented on a computer, such as a server, a desktop or tower computer, a laptop or notebook computer, a thin client, a tablet computer, or smartphone, which may be accessed by a user either directly or via a network such as the Internet, according to example embodiments. The system 100 may display animations to a user which may include, for example, calendar events, menus, tool tips, or new windows or browser tabs switching or fading in or out. The functions described herein may be functions of an operating system or browser, and may be downloadable extensions thereof.

The system 100 may display the animations to the user, and the animations may change and/or move as a function of time. The animations may, for example, move or slide across a screen or display, expand, fade in or out of the display, or change shape or color as a function of time. The animations may appear the same each time, and may be displayed to the user in response a same event, trigger, or function call. For example, calendar alerts may be shown to the user based on a preset clock time triggering a calendar alert. Other animations, such as tool tips or menus, may be triggered by a cursor being placed on a certain object in a display.

As a user becomes more familiar with the computing system 100, the user may no longer need the animations to be reminded of where or how to interact with objects. For example, if an animation includes an object moving across the display to a final location at which the user may click on the object, the user may begin to move the cursor to, or click in (or click and release in) the end point of the object before the object arrives at the end point. The system 100 may adapt the animations to the user's input and may, for example, change the animation by moving the object across the display more quickly, placing the object at the final location and thereby skipping the animation, or changing the appearance of the object. The system 100 may change or accelerate the animation independently of, and without changing, other animations. The system 100 may change or accelerate the animation without explicit user intervention, such as without receiving an instruction from the user to change the animation.

In the example shown in FIG. 1, the system 100 may include a processor 102 and a memory 104. The processor 102 may execute instructions, and may be responsible for performing operations such as determining which animation to display to the user, monitoring the input of the user (or the user's interaction with the object), and generating objects for animation and/or display to the user. The memory 104 may store instructions to be executed by the processor 102, and may store values which are determined by the processor 102, and/or which may later be accessed by the processor 102.

The system 100 may also include one or more input modules 106 and one or more output modules 108. The input module(s) 106 may include, for example, one or more human interface devices (HIDs), such as a keyboard, mouse, trackball, voice input, or other input devices. The system 100 may monitor the inputs received via the input module 106, and may perform operations and provide outputs based on the received inputs. The output module(s) 108 may include, for example, a display such as a touchscreen, a liquid crystal display (LCD), a plasma screen, or a light-emitting diode (LED) display, or a speaker. The output 108 may, for example, display or show the animations to the user, which may include the objects generated by the processor 102.

The processor 102 may execute, for example, an input monitor 110 and a user interface generator 112. The input monitor 110 may monitor, and make determinations based on, the user's interaction with the animation and/or object. The user interface generator 112 may generate the animation of the object, based at least in part on the monitored input. The user interface generator 112 may include an input processor 118 that processes the input received via the input module 106. The input processor 118 may, for example, process the keystrokes or mouse movements, and may process the interaction by the user with the objects displayed on the output module 108.

The user interface generator 112 may also include an animation generator 120. The animation generator 120 may instruct an object generator 122 of the user interface generator 112 to generate the objects such as menus, alerts, tool tips, or windows and tabs. The animations generated by the animation generator 120 may be the same until the input monitor 110 determines that the animations should be changed. The animation generator 120 may generate the first series of animations, which may include default speed and size for the object(s), and may thereafter change the animations based on predetermined criteria, such as the number of times that the animations are shown to the user or the monitored interaction of the user with the animations. The animations may be changed based on a threshold number of times shown or monitored interactions, and/or may be gradually changed or accelerated based on the times shown or monitored interactions.

The user interface generator 112 may also include the object generator 122. The object generator 122 may generate the objects which are displayed to the user. The object generator 122 may generate the objects, which may have attributes such as type, size, and color, which are animated or moved across the screen.

The user interface generator 112 may also include an object mover 124. The object mover 124 may provide the animation to the objects. The object mover 124 may, for example, provide a location change to the object as a function of time, such as a movement across the screen. The location change may be based on a determined speed of the object. For example, during a "normal" state, the location change may be a first number of pixels per unit of time, but if the animation speed is increased based on the user's interaction with the object, or based on the number of animations displayed to the user, then the location change may be a second number of pixels per unit of time. The second number of pixels per unit of time may be greater than the first number of pixels per unit of time, and may be a multiple of the first number, such as two, three, four, or five times as many pixels per unit of time, as non-limiting examples.

The input monitor 110 may monitor the user's interaction with the animations and the objects that are animated. The input monitor 110 may, for example, include a counter 114. The counter 114 may count the number of times that an animation is shown or displayed to a user. The input monitor 110 may, for example, compare the number of times the animation is displayed by the user (which may be counted by the counter 114) to a threshold. If the number of times the animation is displayed to the user meets or exceeds the threshold, the input monitor 110 may send a message to the user interface generator 112 prompting the animation generator 120 and/or the user interface generator 112 to change a subsequent iteration of the animation.

The input monitor 110 may also include a listener 116. The listener 116 may, in conjunction with the input processor 118 of the user interface generator 112, monitor the user's interaction with the animations and/or objects. The listener 116 may monitor mouse movements or other movements of the cursor by the user (or mouse clicks or mouse clicks and releases). The listener 116 may, for example, determine that the user is moving the cursor to (and/or clicking on) a location where the object of the animation will ultimately end up before the object actually arrives there, or determine that the user or cursor has clicked on the object of the animation within a threshold period of time. If the listener 116 determines that the user is moving the cursor to the end point of the animation before the object arrives at the end point (or clicking on the object within the threshold period of time), then the listener 116 may send a message to the animation generator 120 of the user interface generator 112, prompting the user interface generator 106 and/or animation generation 114 to modify the animation.

The memory 104 of the system 100 may include instructions 132. The instructions 132 may include code which the processor 102 executes to perform various functions, such as the display, generation, and monitoring of animations and the user's interaction therewith, as well as displaying the modified animations.

The memory 104 may store a threshold 126. The threshold 126, display count 128, and/or input record 130 may be stored individually for each of a plurality of unique animations associated with different events, triggers, or function calls, allowing the system 100 to change a single animation without changing other animations. The threshold 126 may be a number of times that an animation should be displayed to the user until the animation should be changed.

The memory 104 may also include a display count 128. The display count 128 may store the number of times a particular animation has been displayed to a particular user, and the counter 114 of the input monitor 110 may increment the value in the display count 128 each time the animation is displayed to the user. The animation generator 120 of the user interface generator 112 may compare the value stored in the display count 128 of the memory 104 to the threshold 126. If the value stored in the display counter 128 meets or exceeds the threshold 126, then the animation generator 114 may modify the animation.

The memory 104 may also include an input record 130. The input record 130 may store values or be incremented or toggled by the listener 116 of the input monitor 110. The input record 130 may, for example, record whether the listener 116 of the input monitor 110 determines that the user is anticipating the movement of the animation and that the animation should be changed. The input record 130 may be checked by the animation generator 120 of the user input generator 112 to determine whether the animation should change. If the input record 130 indicates that the user is anticipating the movement of the animation, then the animation generator 120 may change the animation.

Figure 2A:
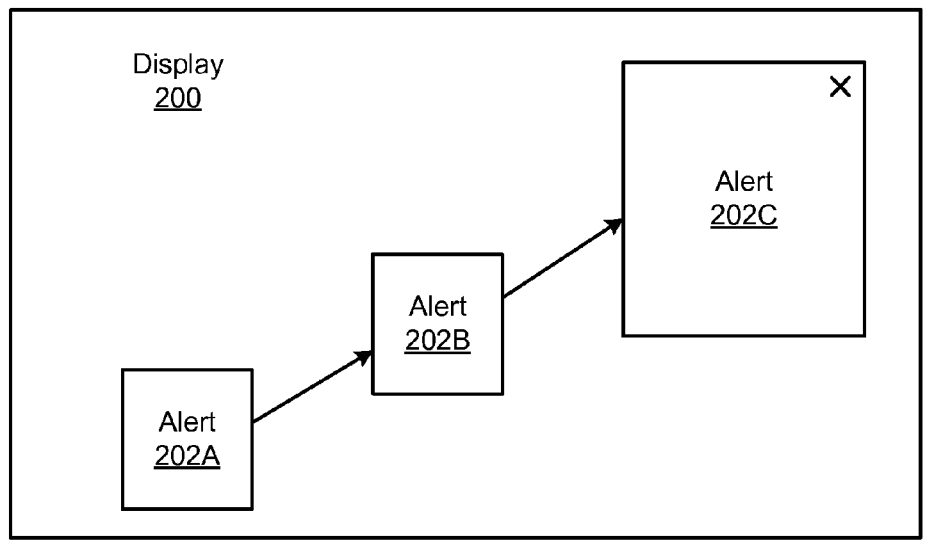
FIG. 2A is a diagram showing an animation according to an example embodiment.

FIG. 2A is a diagram showing an animation according to an example embodiment. The animation may be shown on a display 200. The display 200 may include, for example, a touchscreen, a liquid crystal display (LCD), a plasma screen, a light-emitting diode (LED) display, or other output module 108 of the computing system 100 shown and described with respect to FIG. 1. The animation may be shown to a user a series of times in response to a same input, event trigger, or function call. The animation may appear the same each time in the series until the animation generator 120 changes the animation, such as based on the number of times the animation has been displayed or based on monitoring the user's interaction with the animation.

In an example embodiment, the animation may include an alert. The alert may include, for example, a calendar alert, notifying the user that an appointment time has arrived or reminding the user that an appointment will arrive in a specified time, such as fifteen minutes. While the alert is denoted in FIG. 2A with three reference characters and boxes, 202A, 202B, 202C, the three reference characters and boxes 202A, 202B, 202C may denote the same object, the alert, at different times, illustrating the movement of the alert across the display 200. Also, while the alert 202A, 202B, 202C is shown in three locations of the display 200, the movement of the alert across the display 200 may be much more gradual, and the alert may appear to move across the display 200 in a continuous fashion; many more snapshots of the display 200 could show the alert in many locations between the original location in the lower-left hand portion of the display 200 and the final location in the upper-right hand portion of the display 200.

The alert (referred to without reference to a particular time or location as alert 202) may begin at a lower-left hand portion of the display 200, shown as alert 202A, and move to an upper-right hand portion of the display 200. In this example, the alert 202A may begin in the lower-left hand portion of the display 200, and may move to a center portion of the display 200, as shown by the alert 202B. The alert 202B may finally arrive at an upper-right hand portion of the display 200 as shown by the alert 202C. In this example, the alert 202C includes an 'X' which the user may click on to close out the alert 202C and remove the alert 202C from the display 200. Or, the user may click on another portion of the alert 202C to expand the alert 202C and view details of the alert 202C, such as a time and location of an appointment, a description of the appointment, and/or who the appointment is with.

The system 100 may display the animated alert 202 to the user a series of times. In an example embodiment, the counter 114 of the input monitor 110 may increment the display count 128 each time the system 100 displays the animated alert 202 to the user. The animation generator 120 of the user interface generator 112 may, based on the display count 128 meeting or exceeding the threshold 126, change the animation.

In another example embodiment, the listener 116 of the input monitor 110 may monitor the user's interaction with the alert 202. As the user sees this series of animated alerts 202, the user may begin to anticipate where the alert 202C will ultimately arrive on the display 200.

Figure 2B:
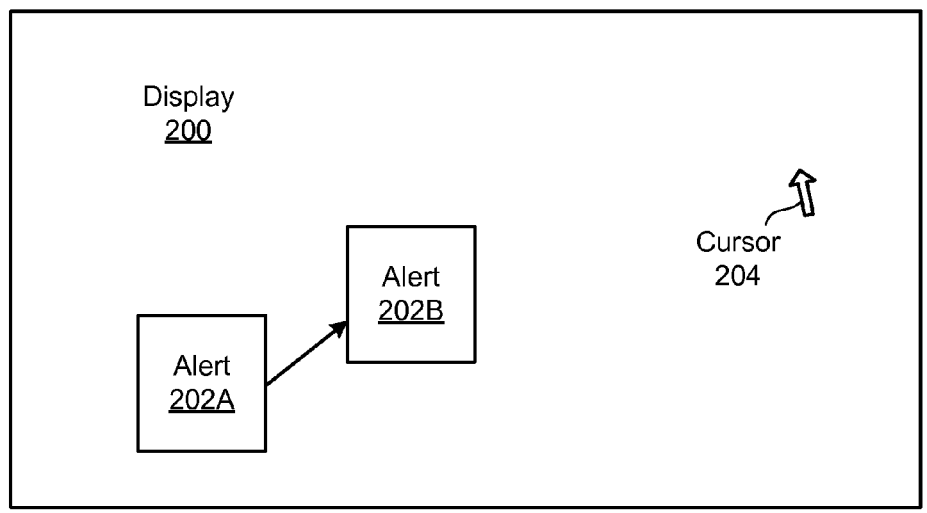
FIG. 2B is a diagram showing the user anticipating the movement of the animation according to an example embodiment.

FIG. 2B is a diagram showing the user anticipating the movement of the animation, which may include the alert 202, across the display 200, according to an example embodiment. In this example, the alert 202A begins in the lower-left hand portion of the display 200, and by the time the alert 202B has moved to the central portion of the display 200, the user has already moved a cursor 204 to the upper-right hand portion of the display 200 where the alert 202 will ultimately arrive. The user may have moved the cursor 204 to the portion of the display 200 where the alert 202 will ultimately arrive with intent to click on the alert 202, but because the alert 202 has not yet arrived at this location, the user may be unable to click on the alert 202. The listener 116 of the input monitor 110 shown in FIG. 1 may determine that the user has placed the cursor 204 in the upper-right hand portion of the display 200 before the alert has arrived at the final destination.

The listener 116 of the input monitor 110 may determine, based on the user's placement of the cursor 204 (and/or clicking or clicking and releasing) in the upper-right hand portion of the display 200, that the user is anticipating the movement and/or final location of the alert. The listener 116 may send a message to the animation generator 120 of the user interface generator 112 indicating that the user is anticipating the movement or animation of the alert 202. The animation generator 120 of the user interface generator 112 may determine, based on the user's anticipation of the animation of the alert, as indicated by the message received from the listener 116 (or based on checking the input record 130 which was updated by the listener 116), to modify the animation. The animation generator 120 may determine to modify the animation based on a single such anticipation, or based on a threshold number, such as two, three, four, or five anticipations, as non-limiting examples. The animation generator 120 may also require the threshold number to be reached within a predetermined number, or window, of animations, such as the previous N animations, where N may be either equal to or greater than the threshold number of anticipated animations.

Figure 2C:
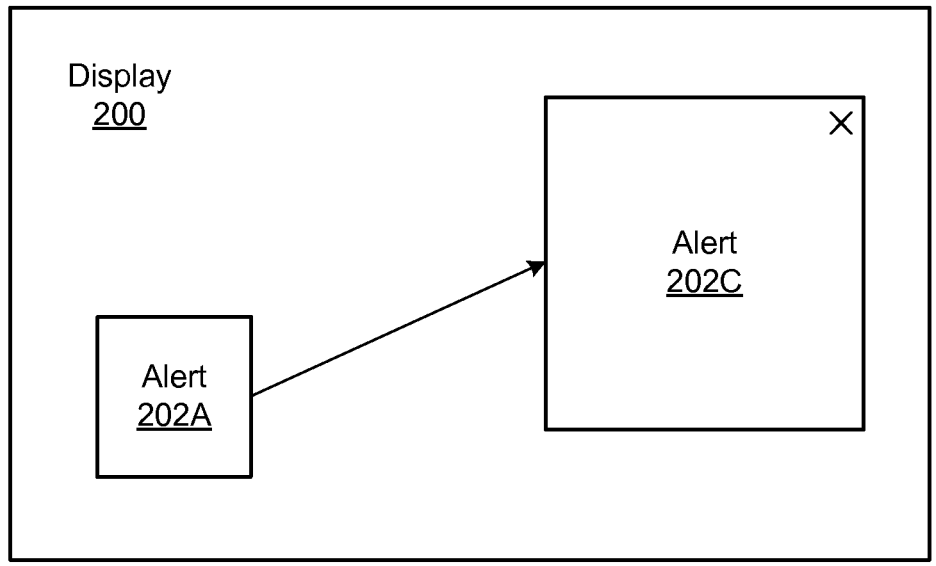
FIG. 2C is a diagram showing the animation speed up based on the user's anticipation of the movement of the animation according to an example embodiment.

FIG. 2C is a diagram showing the animation of the alert 202 speed up based on the user's anticipation of the movement of the animation, according to an example embodiment. The animation may also speed up based on the number of times that the system 100 has shown the animation to the user. The animation generator 120 of the user interface generator 112 may speed the movement of the alert 202 across the display 200 based on the display count 128 meeting or exceeding the threshold 126, or based on the input record 130 reflecting that the listener 116 has determined that the user has anticipated the movement of the alert 202.

In the example shown in FIG. 2C, the alert 202 may move very quickly across the screen, from the original position in the lower-left hand portion of the display 200, shown by the alert 202A, to the final position in the upper-right hand portion of the display 200, shown by the alert 202C. While only two positions of the alert 202A, 202C are shown in FIG. 2C, the alert 202 may travel continuously across the display 200 from the original position in the lower-left hand portion of the display 200 to the final position in the upper-right hand portion of the display 200; the two positions are shown in FIG. 2C to highlight the faster movement across the display 200 in the example of FIG. 2C than in the example of FIG. 2A. In the example shown in FIG. 2C, the alert 202C may have arrived in the upper-right hand portion of the display 200 in the time that the alert 202B previously took to arrive in the central portion of the display 200 in the example of FIG. 2A; thus in the example of FIG. 2C, the alert 202C has quickly arrived in the upper-right hand portion of the display 200 and the user may quickly click on the 'X' portion (or any other portion) of the alert 202C to close out (or expand) the alert 202C.

Figure 2D:
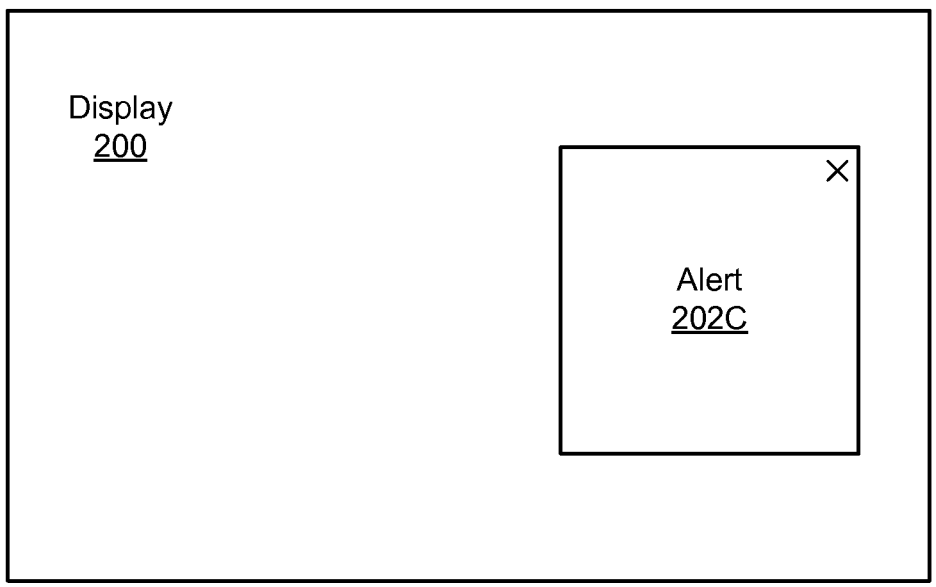
FIG. 2D is a diagram showing the animation in the final portion of the display according to an example embodiment.

FIG. 2D is a diagram showing the animation, including alert 202C, in the final, upper-right hand portion of the display 200, according to an example embodiment. In this example, the animation generator 120 has changed the animation so that the alert 200 does not move across the display 200; instead, the alert 202C simply appears in the upper-right hand, final portion of the display 200. Thus, rather than animating the alert 200 to move from the lower-left hand portion of the display 200, through the center of the display 200, to the final location in the upper-right hand portion of the display 200, the alert 202C simply appears or arrives at the upper-right hand portion of the display 200, where the user may click on the 'X' (or other portion) of the alert 202C.

Figure 2E:
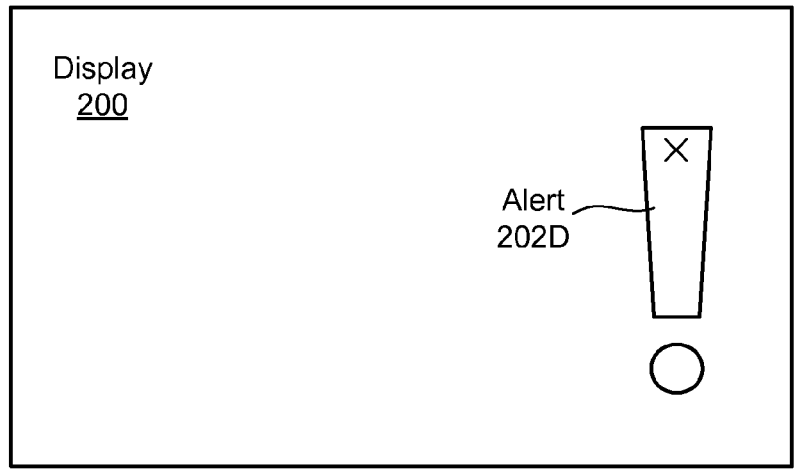
FIG. 2E is a diagram showing a changed animation based on the user's monitored interaction with the animation according to an example embodiment.

FIG. 2E is a diagram showing an alert 202D on the display 200 in an example in which the animation generator 120 of the user interface generator 112 has changed the appearance of the alert 202 to appear as an exclamation point based on the user's monitored interaction with the alert 202. Thus, in this example, based on the monitoring of the user's interaction with the alert 202 shown in FIGS. 2A and 2B, or the number of times the system 100 has displayed the alert 200 to the user, the animation generator 120 and/or object generator 122 of the user interface generator 112 may modify the appearance of the alert 202, and the object generator 116 may present an alert 202C or object with a different appearance than previous appearances of the alert 202.

Figure 3:
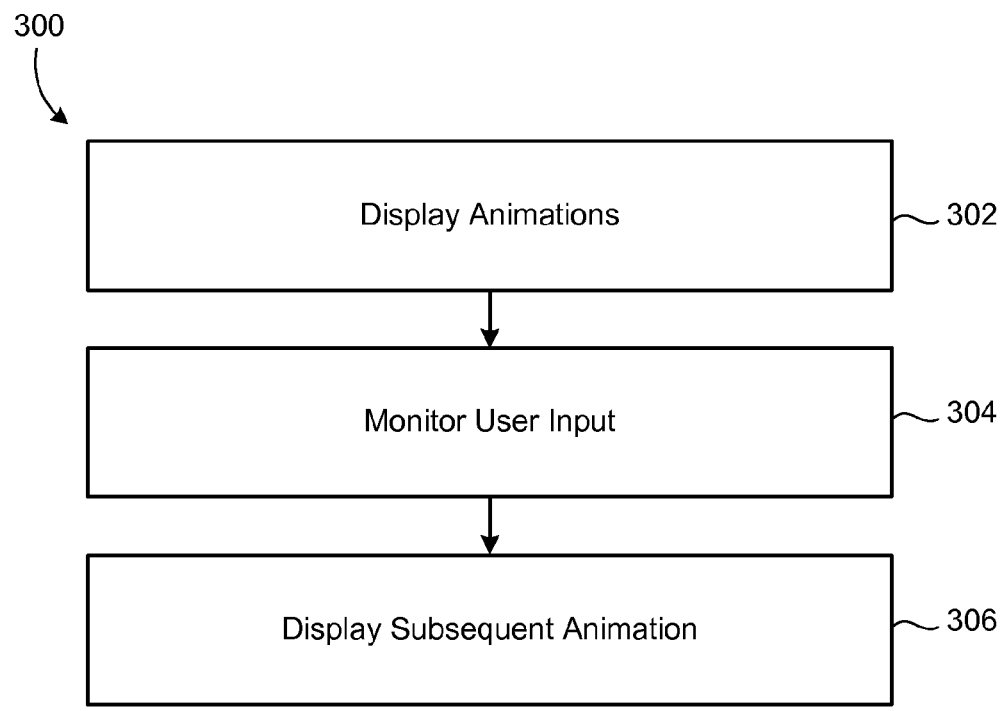
FIG. 3 is a flowchart showing a method according to an example embodiment.

FIG. 3 is a flowchart showing a method 300 according to an example embodiment. According to an example implementation, the method 300 may include displaying, on a graphical user interface (GUI) on a display 200 of the computing system 100, a plurality of initial animations 202A, 202B, 202C to a user, each of the plurality of animations 202A, 202B, 202C being displayed in response to an identical function call, having an identical visual appearance, and being displayed to prompt an input from the user (302). The method 300 may also include monitoring, by a processor 102 of the computing system 100, the user's input to each of the plurality of animations 202A, 202B, 202C (304). The method 300 may also include displaying, by the GUI, a subsequent animation 202A, 202C to the user, the subsequent animation 202A, 202C being displayed in response to the identical function call but having a different visual appearance than the plurality of initial animations 202A, 202B, 202C, the different visual appearance of the subsequent animation 202A, 202C being based on the monitored inputs (306).

According to an example implementation, the monitoring the user's input (304) may include determining that the user has moved a cursor 204 to an end point of the animation before the animation has arrived at the end point and wherein the different visual appearance of the subsequent animation is based on the determination that the user has moved the cursor 204 to the end point of the animation before the animation has arrived at the end point.

According to an example implementation, the monitoring the user's input (304) may include determining that the user has clicked on an object of the animation 202A, 202B, 202C within a threshold period of time and wherein the different visual appearance of the subsequent animation is based on the determination that the user has clicked on the object of the animation within the threshold period of time.

According to an example implementation, the monitoring the user's input (304) may include determining that the animation 202A, 202B, 202C has been displayed to the user at least a threshold number of times and wherein the different visual appearance of the subsequent animation is based on the determination that the animation 202A, 202B, 202C has been displayed to the user at least the threshold number of times.

According to an example implementation, the different visual appearance may include an increased rate of change of the animation.

According to an example implementation, the different visual appearance may include an increased speed of movement of the animation across the display 200.

The method of claim 1, wherein the different visual appearance includes a final image of the animation without motion of the animation.

FIG. 4 shows an example of a generic computing device 400 and a generic mobile computer device 450, which may be used with the techniques described herein. Computing device 400 is intended to represent various forms of digital computers, such as laptops, desktops, workstations, personal digital assistants, servers, blade servers, mainframes, and other appropriate computers. The computing device 400 may also include a television, such as a liquid crystal display (LCD) television, plasma television, or light-emitting diode (LED) television, as non-limiting examples. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low speed controller 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory devices 474 may also be provided and connected to device 450 through expansion interface 472, which may include, for example, a SIMM (Single In Line Memory Module) card interface or trusted platform module (TPM). Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards or TPM modules, along with additional information, such as placing identifying information on the SIMM card or TPM module in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium including instructions stored thereon that, when executed by at least one processor, cause a computing system to at least:
   display, on a graphical-user interface (GUI) on a display of the computing system, a plurality of initial animations to a user, each of the plurality of initial animations comprising transitions from a first position on the display to a final position on the display, the transitions being displayed to the user;
   determine, by the at least one processor of the computing system, that the user is anticipating the transitions of at least a threshold number of the plurality of initial animations, the threshold number being at least two; and
   display, by the GUI, a final animation to the user, the final animation being displayed in response to a substantially identical user interaction as each of the plurality of initial animations but transitioning from the first position to the final position faster than each of the plurality of initial animations, the faster transitioning of the final animation being based on the determined anticipation.

2. The storage medium of claim 1, wherein:
   the determining that the user is anticipating the transitions of at least the threshold number of the plurality of initial animations includes determining that the user has moved a cursor to an end point of at least the threshold number of the plurality of initial animations before the initial animations have arrived at the end point; and
   the faster transitioning of the final animation is based on the determination that the user has moved the cursor to the end point of the animation before the animation has arrived at the end point for at least the threshold number of animations.

3. The storage medium of claim 1, wherein:
   the determining that the user is anticipating the transitions of the initial animation includes determining that the user has clicked on an object of the animation within a threshold period of time for at least the threshold number of animations; and
   the faster transitioning of the final animation is based on the determination that the user has clicked on the object of the animation within the threshold period of time for at least the threshold number of animations.

4. The storage medium of claim 1, wherein the faster transitioning includes an increased speed of movement of the animation across the display.

5. A method comprising:
   displaying, on a graphical-user interface (GUI) on a display of a computing system, a plurality of initial animations to a user, each of the plurality of initial animations comprising transitions from a first position on the display to a final position on the display, the transitions being displayed to the user;
   determining, by at least one processor of the computing system, that the user is anticipating the transitions of at least a threshold number of the plurality of initial animations, the threshold number being at least two; and
   displaying, by the GUI, a final animation to the user, the final animation being displayed in response to a substantially identical user interaction as each of the plurality of initial animations but transitioning from the first position to the final position faster than each of the plurality of initial animations, the faster transitioning of the final animation being based on the determined anticipation.

6. The method of claim 5, wherein:
   the determining that the user is anticipating the transitions of at least the threshold number of the plurality of initial animations includes determining that the user has moved a cursor to an end point of at least the threshold number of the plurality of initial animations before the initial animations have arrived at the end point; and
   the faster transitioning of the final animation is based on the determination that the user has moved the cursor to the end point of the animation before the animation has arrived at the endpoint for at least the threshold number of animations.

7. The method of claim 5, wherein:
   the determining that the user is anticipating the transitions of the initial animation includes determining that the user has clicked on an object of the animation within a threshold period of time for at least the threshold number of animations; and
   the faster transitioning of the final animation is based on the determination that the user has clicked on the object of the animation within the threshold period of time for at least the threshold number of animations.

8. The method of claim 5, wherein the faster transitioning includes an increased speed of movement of the animation across the display.

9. An apparatus comprising:
   at least one processor; and
   at least one storage device comprising instructions stored thereon that, when executed by the at last one processor, cause the apparatus to at least:
   display, on a graphical-user interface (GUI) on a display of the apparatus, a plurality of initial animations to a user, each of the plurality of initial animations comprising transitions from a first position on the display to a final position on the display, the transitions being displayed to the user;
   determine, by the at least one processor of the apparatus, that the user is anticipating the transitions of at least a threshold number of the plurality of initial animations, the threshold number being at least two; and
   display, by the GUI, a final animation to the user, the final animation being displayed in response to a substantially identical user interaction as each of the plurality of initial animations but transitioning from the first position to the final position faster than each of the plurality of initial animations, the faster transitioning of the final animation being based on the determined anticipation.

10. The apparatus of claim 9, wherein:
    the determining that the user is anticipating the transitions of at least the threshold number of the plurality of initial animations includes determining that the user has moved a cursor to an end point of at least the threshold number of the plurality of initial animations before the initial animations have arrived at the end point; and
    the faster transitioning of the final animation is based on the determination that the user has moved the cursor to the end point of the animation before the animation has arrived at the end point for at least the threshold number of animations.

11. The apparatus of claim 9, wherein:
    the determining that the user is anticipating the transitions of the initial animation includes determining that the user has clicked on an object of the animation within a threshold period of time for at least the threshold number of animations; and the faster transitioning of the final animation is based on the determination that the user has clicked on the object of the animation within the threshold period of time for at least the threshold number of animations.

12. The apparatus of claim 9, wherein the faster transitioning includes an increased speed of movement of the animation across the display.

\* \* \* \* \*